US007562191B2

(12) United States Patent
Knoth

(10) Patent No.: US 7,562,191 B2

(45) Date of Patent: Jul. 14, 2009

(54) MICROPROCESSOR HAVING A POWER-SAVING INSTRUCTION CACHE WAY PREDICTOR AND INSTRUCTION REPLACEMENT SCHEME

(75) Inventor: Matthias Knoth, San Jose, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 440 days.

(21) Appl. No.: 11/272,719

(22) Filed: Nov. 15, 2005

(65) Prior Publication Data

US 2007/0113013 A1 May 17, 2007

(51) Int. Cl.
*G06F 12/12* (2006.01)

(52) U.S. Cl. ...................................... 711/128; 711/131

(58) Field of Classification Search .................. 711/128
See application file for complete search history.

(56) References Cited

U.S. PATENT DOCUMENTS

| | | | | |
|---|---|---|---|---|
| 2,304,215 | A * | 12/1942 | Streubel | 446/48 |
| 5,091,851 | A | 2/1992 | Shelton et al. | |
| 5,325,511 | A | 6/1994 | Collins et al. | |
| 5,493,667 | A | 2/1996 | Huck et al. | |
| 5,734,881 | A | 3/1998 | White et al. | |
| 5,764,999 | A | 6/1998 | Wilcox et al. | |
| 5,809,326 | A | 9/1998 | Nogami | |
| 5,848,433 | A * | 12/1998 | Tran et al. | 711/137 |
| 5,966,734 | A | 10/1999 | Mohamed et al. | |
| 6,044,478 | A | 3/2000 | Green | |
| 6,076,159 | A | 6/2000 | Fleck et al. | |
| 6,085,315 | A | 7/2000 | Fleck et al. | |
| 6,167,536 | A | 12/2000 | Mann | |
| 6,430,655 | B1 | 8/2002 | Courtright et al. | |

(Continued)

FOREIGN PATENT DOCUMENTS

GB 2 304 215 A 3/1997

OTHER PUBLICATIONS

Krewell, Kevin, "Intel Looks To Core For Success", Microprocessor Report, vol. 20, Mar. 2006, pp. 1, 4, 5 and 6.

(Continued)

*Primary Examiner*—Hyung S Sough
*Assistant Examiner*—Hamdy S Ahmed
(74) *Attorney, Agent, or Firm*—Sterne, Kessler, Goldstein & Fox P.L.L.C.

(57) ABSTRACT

Microprocessor having a power-saving instruction cache way predictor and instruction replacement scheme. In one embodiment, the processor includes a multi-way set associative cache, a way predictor, a policy counter, and a cache refill circuit. The policy counter provides a signal to the way predictor that determines whether the way predictor operates in a first mode or a second mode. Following a cache miss, the cache refill circuit selects a way of the cache and compares a layer number associated with a dataram field of the way to a way set layer number. The cache refill circuit writes a block of data to the field if the layer number is not equal to the way set layer number. If the layer number is equal to the way set layer number, the cache refill circuit repeats the above steps for additional ways until the block of memory is written to the cache.

20 Claims, 6 Drawing Sheets

U.S. PATENT DOCUMENTS

| | | | |
|---|---|---|---|
| 6,477,639 | B1 | 11/2002 | Krishnan et al. |
| 6,505,285 | B1 | 1/2003 | Rabinovici et al. |
| 6,546,477 | B1 | 4/2003 | Russo et al. |
| 6,557,127 | B1 | 4/2003 | Adams et al. |
| 6,757,817 | B1 | 6/2004 | Booth |
| 6,836,833 | B1 | 12/2004 | Kinter et al. |
| 2002/0087900 | A1 | 7/2002 | Homewood et al. |
| 2004/0024968 | A1 | 2/2004 | Lesartre et al. |
| 2004/0193858 | A1 | 9/2004 | Ahmad et al. |
| 2005/0044429 | A1 | 2/2005 | Gaskins et al. |
| 2005/0102483 | A1 | 5/2005 | Kinter et al. |
| 2005/0246499 | A1 | 11/2005 | Saida et al. |
| 2007/0113050 | A1 | 5/2007 | Knoth |
| 2007/0113057 | A1 | 5/2007 | Knoth |

OTHER PUBLICATIONS

Bellas, N. et al., "Architectural and Compiler Techniques for Energy Reduction in High-Performance Microprocessors," *IEEE Trans. on Very Large Scale Integration (VLSI) Systems*, vol. 8, No. 3, pp. 317-326 (Jun. 2000).

Cotterell, S. and Vahid, F., "Tuning of Loop Cache Architecture to Programs in Embedded System Design," *ISSS'02*, 6 pages (Oct. 2002).

Fukuoka, K. et al., "Leakage Power Reduction for Clock Gating Scheme on PD-SOI," *IEEE Computer Society Int'l Symp. on Circuits and* Systems, pp. 613-616 (2004).

Pierce, J. and Mudge, T., "Wrong-Path Instruction Prefetching," *IEEE Computer Society 29th Int'l. Symp. on Microarchitecture*, pp. 165-175 (1996).

Solomon, B. et al., "Micro-Operation Cache: A Power Aware Frontend for Variable Instruction Length ISA," *Symp. on Low Power Electronics and Design*, pp. 4-9 (Aug. 2001).

Intel Architecture Software Developer's Manual—vol. 2: Instruction Set Reference, Intel. Corporation, pp. 3-278 and 3-279 (1997).

Watts, C. et al., "ARM Intelligent Energy Manager Future Evolution," paper copy of slide presentation distributed at the ARM Developers' Conference '04, 34 sheets (Oct. 2004).

Kandemir, M. et al., "Dynamic Management of Scratch-Pad Memory Space," *Proceedings of the 38th Design Automation Conference*, ACM, Las Vegas, Nevada, pp. 690-695 (Jun. 2001).

Panda, P. et al., "Data Memory Organization and Optimizations in Application-Specific Systems," *IEEE Design & Test of Computers*, IEEE, pp. 56-68 (May 2001).

Kandemir, M. et al., "Exploiting Shared Scratch Pad Memory Space in Embedded Multiprocessor Systems," *Proceedings of the 39th Design Automation Conference*, ACM, New Orleans, Louisiana, pp. 219-224 (Jun. 2002).

Kandemir, M. et al., "Exploiting Scratch Pad Memory Using Presburger Formulas," *Proceedings of ISSS '01*, ACM, Montreal, Quebec, Canada, pp. 7-12 (Oct. 2001).

Panda, P. et al., "Efficient Utilization of Scratch-Pad Memory in Embedded Processor Applications," *Proceedings of the European Design & Test Conference ED&TC* 97, IEEE, Paris France, pp. 7-11 (Mar. 1997).

Banakar, R. et al., "Scratchpad Memory: A Design Alternative for Cache On-chip memory in Embedded Systems," *Proceedings of CODES '02*, ACM, Estes Park, Colorado, pp. 73-78 (May 2002).

ADSP-21535 Blackfin™ DSP Brochure, Analog Devices, Inc., 4 pages (2001).

Nass, R., "Latest DSPs Poised to Drive 3G Revolution," *Portable Design 8*(9):26, 27, 28, 32, and 34, PennWell Corporation, Fair Lawn, New Jersey (Sep. 2001).

Intel® StrongARM® SA-1100 Microprocessor Developer's Manual, Intel. Corporation, pp. i-xix, 1-1 through 1-7, 2-1 through 2-8, and 6-1 through 6-7 (Aug. 1999).

Courtright, D., "Introducing: The MIPS32™ 4Kc™ and MIPS32™ 4Kp™ Processor Cores 'Jade'," paper copy of slide presentation distributed at the Embedded Microprocessor Forum, pp. 1-25 (May 1999).

International Search Report For International Application No. PCT/US2006/044354, filed Nov. 15, 2006.

Matthew C. Merten et al., "Modulo Schedule Buffers", IEEE, Dec. 2001, pp. 138-149.

Lea Hwang Lee, et al., "Instruction Fetch Energy Reduction Using Loop Caches for Embedded Applications with Small Tight Loops", ACM, Nov. 1998, pp. 267-269.

Search Report, dated May 9, 2007, for International Application No. PCT/US2006/044355, 5 pgs.

Search Report for PCT/US2006/044355, completed Apr. 24, 2007 by Liviu Filip, mailed Dec. 14, 2007, 6 pages.

Office Communication, dated Apr. 24, 2007, for U.S. Appl. No. 11/27,718, filed Nov. 15, 2005, 11 pages.

Office Communication, dated Nov. 14, 2007, for U.S. Appl. No. 11/272,718, filed Nov. 15, 2005, 16 pages.

Office Communication, dated Apr. 8, 2008, for U.S. Appl. No. 11/272,718, filed Nov. 15, 2005, 11 pages.

Office Communication, dated Dec. 5, 2008, for U.S. Appl. No. 11/272,718, filed Nov. 15, 2005, 10 pages.

Office Communication, dated Apr. 7, 2009, for U.S. Appl. No. 11/272,718, filed Nov. 15, 2005, 9 pages.

Office Communication, dated Mar. 31, 2008, for U.S. Appl. No. 11/272,737, filed Nov. 15, 2005, 10 pages.

* cited by examiner

MICROPROCESSOR HAVING A POWER-SAVING INSTRUCTION CACHE WAY PREDICTOR AND INSTRUCTION REPLACEMENT SCHEME

CROSS REFERENCE TO RELATED APPLICATIONS

This application is related to commonly owned, co-pending U.S. patent application Ser. No. 11/272,718, filed on the same date herewith, entitled "Processor Utilizing A Loop Buffer To Reduce Power Consumption," and commonly owned, co-pending U.S. patent application Ser. No. 11/272,737, filed on the same date herewith, entitled "Processor Accessing A Scratch Pad On-Demand To Reduce Power Consumption," each of which is incorporated herein by reference in its entirety.

FIELD OF THE INVENTION

The present invention relates generally to microprocessors and reducing power consumption in microprocessors.

BACKGROUND OF THE INVENTION

An instruction fetch unit of a microprocessor is responsible for continually providing the next appropriate instruction to the execution unit of the microprocessor. A conventional instruction fetch unit typically employs a large instruction cache that is always enabled in order to provide instructions to the execution unit as quickly as possible. While conventional fetch units work for their intended purpose, they consume a significant amount of the total power of a microprocessor. This makes microprocessors having conventional fetch units undesirable and/or impractical for many applications.

What is needed is a microprocessor and an instruction fetch unit that offers the performance advantages of a large instruction cache while consuming less power than a conventional fetch unit.

BRIEF SUMMARY OF THE INVENTION

The present invention provides a microprocessor having a power-saving instruction cache way predictor and instruction replacement scheme. In one embodiment, a processor core according to the invention has a multi-cycle processing pipeline for improved performance. The processor core includes a multi-way set associative cache, a way predictor, and a policy counter. The multi-way set associative cache can be, for example, either a 2-way set associative cache, a 4-way set associative cache, an 8-way set associative cache, et cetera. The policy counter provides a policy signal to the way predictor that determines whether the way predictor operates in a first power-saving mode or a second power-saving mode.

When the way predictor is operating in the first power-saving mode, the way predictor enables in one processing cycle a dataram predicted to have an instruction to be fetched from the cache and a tagram associated with the dataram. If the instruction is present in the predicted dataram, the instruction is fetched, and the way predictor and the policy counter are updated to reflect that a cache hit occurred. If the instruction is not in the predicted dataram, the way predictor disables the dataram and its associated tagram and enables all remaining datarams and their associated tagrams in a second processing cycle. If the instruction is determined to be in one of the datarams enabled during the second processing cycle, the instruction is fetched, and the way predictor and the policy counter are updated to indicate that a cache hit occurred and the dataram (way) in which the instruction was stored. If the instruction is not in any of the datarams, the way predictor generates a cache miss signal, and the policy counter is updated to indicate that a cache miss occurred.

When the way predictor is operating in the second power-saving mode, the way predictor enables all tagrams associated with the datarams of the cache in a first processing cycle. If it is determined that the instruction is present in one of the datarams, the tagrams are disabled and the dataram containing the instruction is enabled in a second processing cycle. The instruction is then fetched, and the way predictor and the policy counter are updated to indicate that a cache hit occurred. If it is determined that the instruction is not in any of the datarams, the way predictor generates a cache miss signal, and the policy counter is updated to reflect that a cache miss occurred.

In one embodiment of the present invention, the policy counter includes a register configured to store a count value. The count value is incremented and decremented, based on cache hits and cache misses, between a first value and a second value. Initially, the count value is set to the first value (e.g., zero), and the policy counter provides a first policy signal to the way predictor that cause the way predictor to operate in the first power-saving mode. After a selected number of cache misses (e.g., the count value is incremented to the second value), the policy counter provides a second policy signal to the way predictor that causes the way predictor to operate in the second power-saving mode. If the count value subsequently is decremented to the first value due to a number of cache hits, the policy counter again provides the first policy signal to the way predictor, and the way predictor operates in the first power-saving mode.

In one embodiment of the present invention, the processor core includes a cache refill circuit that refills the cache following a cache miss using a least recent filled scheme. The cache refill circuit operates by selecting a way of the multi-way set associative cache and comparing a layer number (associated with a selected dataram field of the way) to a way set layer number. If the layer number is not equal to the way set layer number, the cache refill circuit writes a block of data from a memory to the selected field. If the layer number is equal to the way set layer number, the cache refill circuit switches to another (e.g., next higher or next lower) way and repeats the above noted steps. If the layer number is again equal to the way set layer number, the steps are repeated for additional ways of the multi-way set associative cache until the block of memory is written to the multi-way set associative cache. The cache refill circuit increments the layer number of the selected field in which the block of memory is written.

In one embodiment, the layer numbers associated with the fields of the datarams are stored in a wayram data structure separate from the datarams. The dataram is only accessed during cache refills, and it can be disabled between cache refills in order to reduce power consumption.

In one embodiment of the present invention, the functionality of the way predictor is expanded to predict whether an instruction to be fetched is residing in a memory other than the multi-way set associative cache such as, for example, a scratch pad or a fill buffer.

In one embodiment, a component of the processor core, such as a tagram, a dataram and/or a scratch pad, is disabled to reduce power consumption by controlling a clock signal provided to the component. By maintaining the input clock signal at either a constant high or a constant low value, state registers in the component are suspended from latching new values, and the logic blocks between the state registers are placed in a stable state. Once the component is placed in a stable state, the transistors in the state registers and the logic blocks are suspended from changing states and therefore do not consume power required to transition states. In one embodiment, when a component is disabled to reduce power consumption, a bias voltage is applied to the component to further reduce power consumption resulting from leakage.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention is described with reference to the accompanying drawings. The drawing in which an element first appears is typically indicated by the leftmost digit in the corresponding reference number.

DETAILED DESCRIPTION OF THE INVENTION

The present invention provides a microprocessor having a power-saving instruction cache way predictor and instruction replacement scheme. In the detailed description of the invention that follows, references to “one embodiment”, “an embodiment”, “an example embodiment”, etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
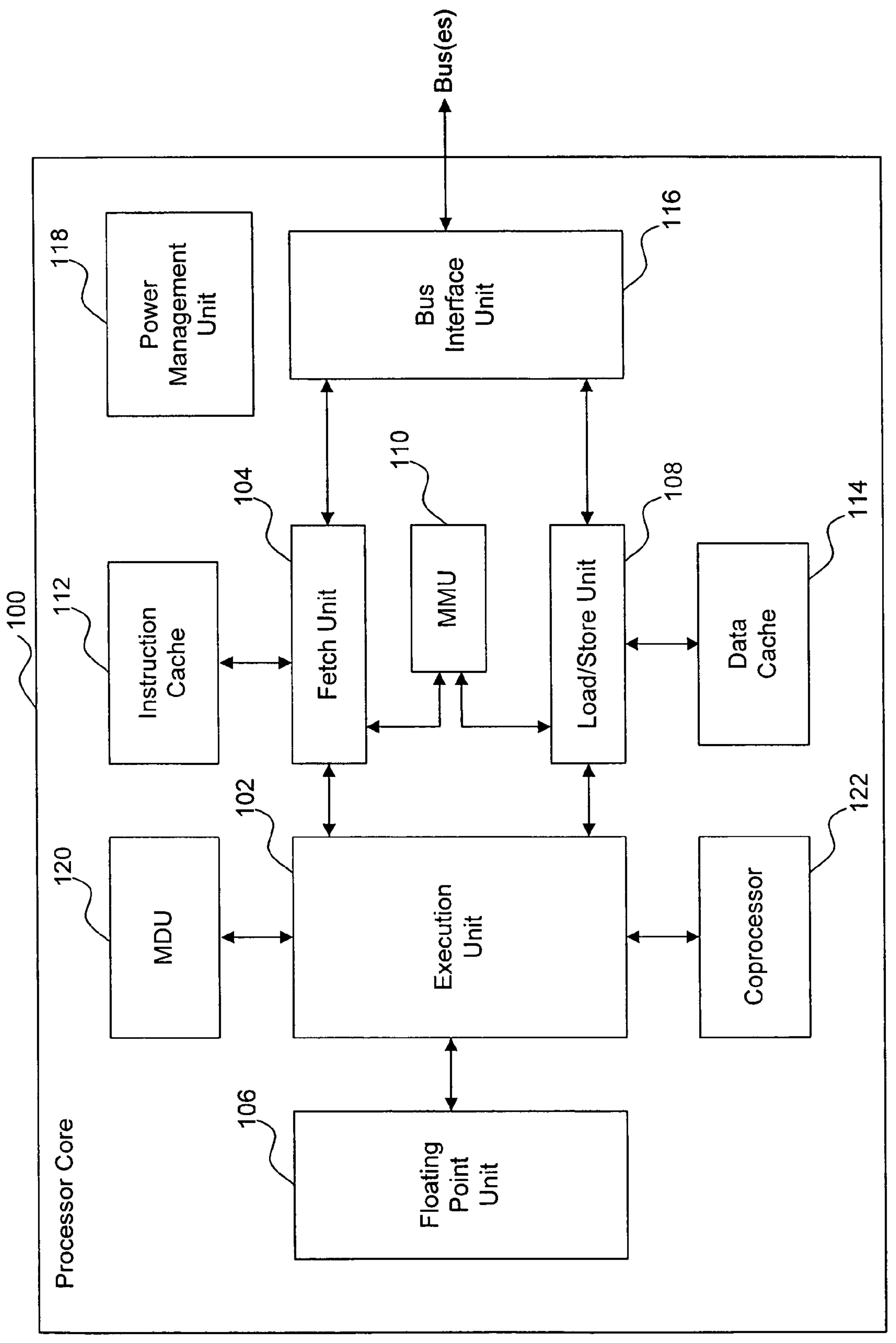
FIG. 1 is a diagram of a processor core according to an embodiment of the present invention.

FIG. 1 is a diagram of a processor core 100 according to an embodiment of the present invention. As shown in FIG. 1, processor core 100 includes an execution unit 102, a fetch unit 104, a floating point unit 106, a load/store unit 108, a memory management unit (MMU) 110, an instruction cache 112, a data cache 114, a bus interface unit 116, a power management unit 118, a multiply/divide unit (MDU) 120, and a coprocessor 122. While processor core 100 is described herein as including several separate components, many of these components are optional components that will not be present in each embodiment of the present invention, or components that may be combined, for example, so that the functionality of two components reside within a single component. Thus, the individual components shown in FIG. 1 are illustrative and not intended to limit the present invention.

Execution unit 102 preferably implements a load-store (RISC) architecture with single-cycle arithmetic logic unit operations (e.g., logical, shift, add, subtract, etc.). In one embodiment, execution unit 102 includes 32-bit general purpose registers (not shown) used for scalar integer operations and address calculations. Optionally, one or more additional register file sets can be included to minimize content switching overhead, for example, during interrupt and/or exception processing. Execution unit 102 interfaces with fetch unit 104, floating point unit 106, load/store unit 108, multiple-divide unit 120 and coprocessor 122.

Fetch unit 104 is responsible for providing instructions to execution unit 102. In one embodiment, fetch unit 104 includes control logic for instruction cache 112, a recorder for recoding compressed format instructions, dynamic branch prediction, an instruction buffer to decouple operation of fetch unit 104 from execution unit 102, and an interface to a scratch pad (not shown). Fetch unit 104 interfaces with execution unit 102, memory management unit 110, instruction cache 112, and bus interface unit 116.

As used herein, a scratch pad is a memory that provides instructions that are mapped to one or more specific regions of an instruction address space. The one or more specific address regions of a scratch pad may be pre-configured or configured programmatically while the microprocessor is running. An address region is a continuous range of addresses that may be specified, for example, by a base address and a region size. When base address and region size are used, the base address specifies the start of the address region and the region size, for example, is added to the base address to specify the end of the address region. Once an address region is specified for a scratch pad, all instructions corresponding to the specified address region are retrieved from the scratch pad.

Floating point unit 106 interfaces with execution unit 102 and operates on non-integer data. As many applications do not require the functionality of a floating point unit, this component of processor core 100 will not be present in embodiments of the present invention.

Load/store unit 108 is responsible for data loads and stores, and includes data cache control logic. Load/store unit 108 interfaces with data cache 114 and other memory such as, for example, a scratch pad and/or a fill buffer. Load/store unit 108 also interfaces with memory management unit 110 and bus interface unit 116.

Memory management unit 110 translates virtual addresses to physical addresses for memory access. In one embodiment, memory management unit 110 includes a translation lookaside buffer (TLB) and may include a separate instruction TLB and a separate data TLB. Memory management unit 110 interfaces with fetch unit 104 and load/store unit 108.

Instruction cache 112 is an on-chip memory array organized as a multi-way set associative cache such as, for example, a 2-way set associative cache, a 4-way set associative cache, an 8-way set associative cache, et cetera. Instruction cache 112 is preferably virtually indexed and physically tagged, thereby allowing virtual-to-physical address translations to occur in parallel with cache accesses. In one embodiment, the tags include a valid bit and optional parity bits in addition to physical address bits. As described in more detail below, it is a feature of the present invention that components of instruction cache 112 can be selectively enabled and disabled to reduce the total power consumed by processor core 100. Instruction cache 112 interfaces with fetch unit 104.

Data cache 114 is also an on-chip memory array. Data cache 114 is preferably virtually indexed and physically tagged. In one embodiment, the tags include a valid bit and optional parity bits in addition to physical address bits. Data cache 114 interfaces with load/store unit 108.

Bus interface unit 116 controls external interface signals for processor core 100. In one embodiment, bus interface unit 116 includes a collapsing write buffer used to merge write-through transactions and gather writes from uncached stores.

Power management unit 118 provides a number of power management features, including low-power design features, active power management features, and power-down modes of operation. In one embodiment, processor core 100 implements a wait instruction that signals to selected components of processor core 100 that execution and/or clocking should be halted, thereby reducing power consumption during the idle period. These power management features are in addition to the power saving features described herein with reference, for example, to FIGS. 3-5.

Multiply/divide unit 120 performs multiply and divide operations for processor core 100. In one embodiment, multiply/divide unit 120 preferably includes a pipelined multiplier, result and accumulation registers, and multiply and divide state machines, as well as all the control logic required to perform, for example, multiply, multiply-add, and divide functions. As shown in FIG. 1, multiply/divide unit 120 interfaces with execution unit 102.

Coprocessor 122 performs various overhead functions for processor core 100. In one embodiment, coprocessor 122 is responsible for virtual-to-physical address translations, implementing cache protocols, exception handling, operating mode selection, and enabling/disabling interrupt functions. Coprocessor 122 interfaces with execution unit 102.

Figure 2:
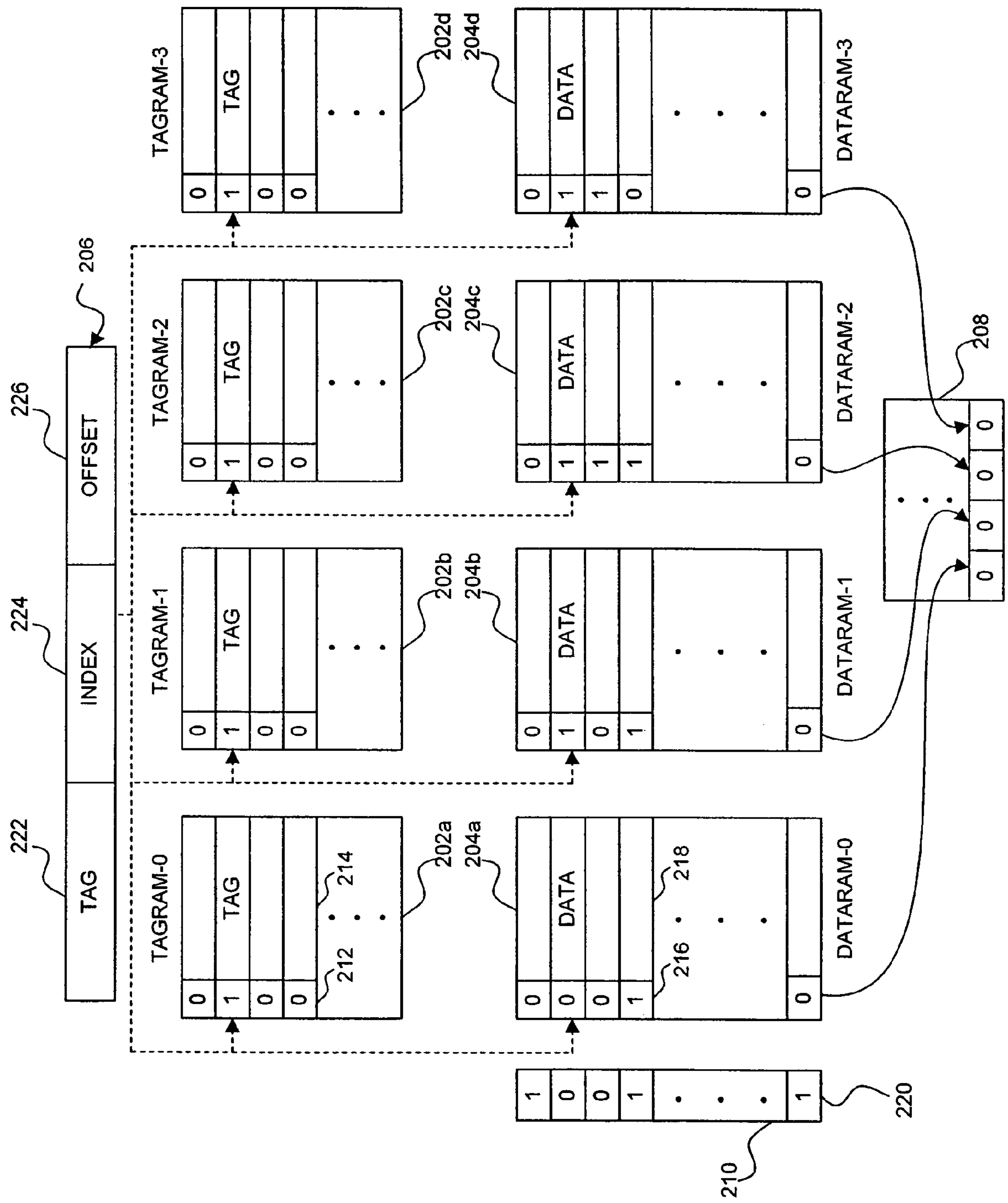
FIG. 2 is a diagram of tagrams and datarams according to an embodiment of the present invention.

FIG. 2 is a diagram of four tagrams 202 and four datarams 204 that make up a 4-way set associative cache. This cache structure represents one embodiment for instruction cache 112.

As shown in FIG. 2, each tagram 202 includes a plurality of fields 214 that store physical address bits or tags. Each tag has an associated valid bit 212. Additional bits (not shown) such as parity bits may also be associated with each tag.

Each dataram 204 includes a plurality of fields 218 that are used to store blocks of data/instructions. As shown in FIG. 2, each block of data has an associated layer number 216. As described in more detail below with reference to FIG. 5, layer numbers 216 are used to determine where in the cache a new block of data is stored following a cache miss. In one embodiment, layer numbers 216 are stored in a data structure 208 referred to herein as a wayram. Wayram 208 can be a separate data structure from datarams 204, which is only enabled during cache refills/cache writes.

Information stored within tagrams 202*a*-*d* and datarams 204*a*-*d* are accessed using an address 206. Address 206 includes a tag 222, an index 224, and an offset 226. A particular index 224 uniquely points to selected fields 214 of each tagram 202 and selected fields 218 of each dataram 204. In order to determine whether a particular instruction is stored in a way (e.g., a dataram 204) of the instruction cache, tag 222 of address 206 is compared to tags stored in tagrams 202 in a manner that will be apparent to persons skilled in the relevant arts given the description herein.

Data structure 210 in FIG. 2 stores way set layer numbers 220. As described in more detail below with reference to FIG. 5, way set layer numbers 220 are used together with layer numbers 216 to determine where in the cache a new block of data is stored following a cache miss. Although layer numbers 216 and way set layer numbers 220 are shown as single bit values in FIG. 2, it is to be understood that they can also be multi-bit values without departing from the scope of the present invention.

Figure 3:
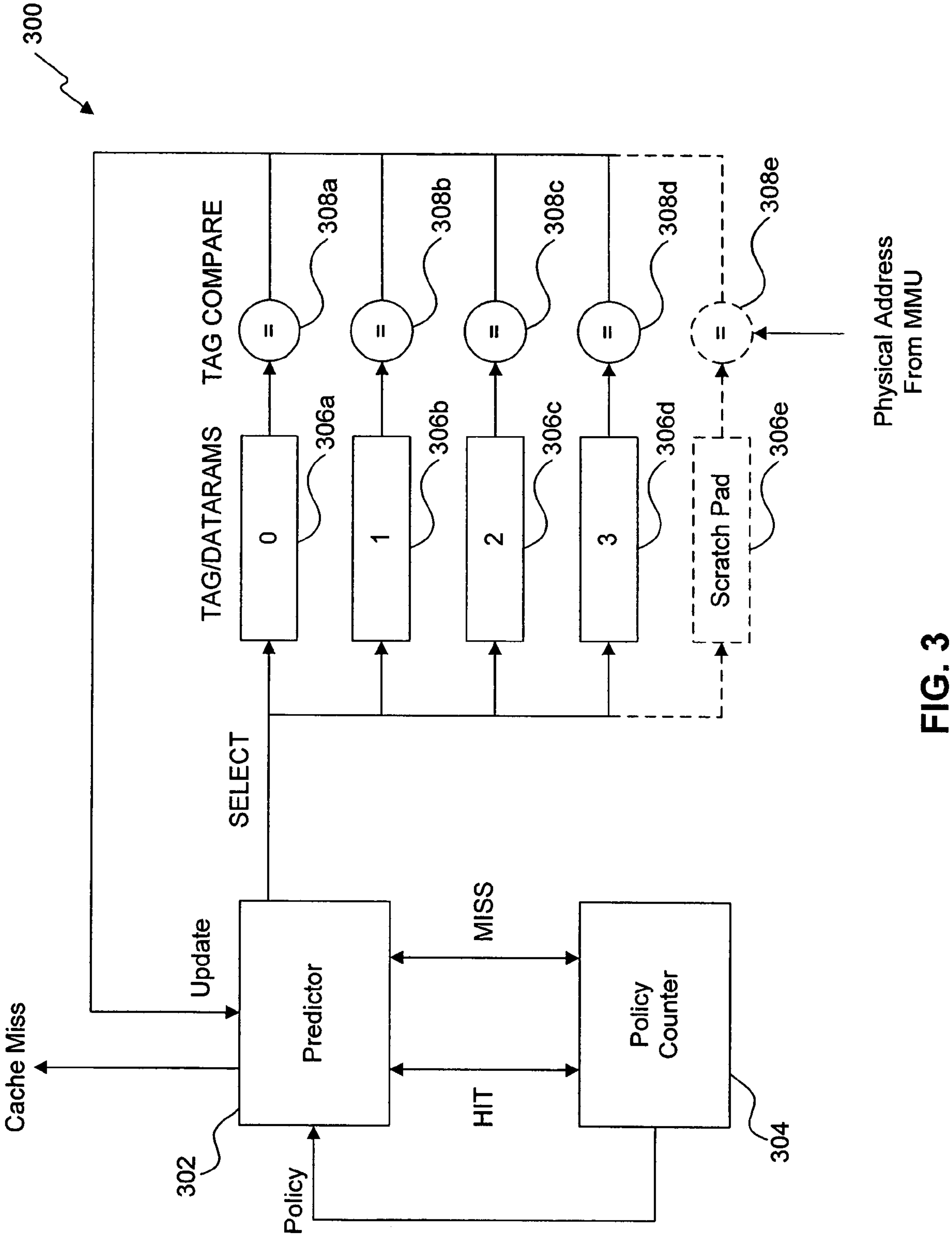
FIG. 3 is a diagram of a predictor and a policy counter according to an embodiment of the present invention.

FIG. 3 is a diagram of a way predictor (predictor) 302 and a policy counter 304 according to an embodiment of the present invention. Predictor 302 predicts where an instruction to be fetched is stored and provides cache hit and miss data to policy counter 304. In one embodiment, predictor 302 always predicts that the next instruction to be fetched is located in the way from which the last instruction was fetched. Other embodiments use more complex prediction schemes. Policy counter 304 includes a memory element such as, for example, a register that keeps track of cache hits and misses. Based on the cache hit and miss data provided by predictor 302, policy counter 304 provides a policy signal to predictor 302 that determines the operating mode of predictor 302.

Predictor 302 interfaces with a plurality of tag/datarams 306 and tag compare circuits 308. Tag/datarams 306*a*-*d* represent a multi-way (e.g., 4-way) set associative cache. Predictor 302 optionally also interfaces with one or more other memory elements 306*e*, such as for example a scratch pad or fill buffer, and their associated tag compare circuits 308*e*.

In one embodiment of the present invention, policy counter 304 provides a policy signal to predictor 302 that determines whether predictor 302 operates in a first power-saving mode or a second power-saving mode. In some embodiments of the invention, predictor 302 operates in more than two power-saving modes. In each operating mode, the number of components that are enabled and/or disabled vary, thereby varying the power consumed by the processor.

When predictor 302 is operating in the first power-saving mode, predictor 302 enables in one processing cycle both a dataram predicted to have an instruction to be fetched and a tagram associated with the dataram. If the instruction is present in the predicted dataram, the instruction is fetched and predictor 302 and policy counter 304 are updated to indicate that a cache hit occurred. As shown in FIG. 3, feedback about whether a dataram contains an instruction comes from a tag compare circuit 308. If the instruction is not in the predicted dataram, predictor 302 disables the dataram and its associated tagram and enables all remaining datarams and their associated tagrams in a second processing cycle. If the instruction is determined to be in one of the datarams enabled during the second processing cycle, the instruction is fetched and predictor 302 and policy counter 304 are updated to reflect that a cache hit occurred and the dataram in which the instruction was stored. If the instruction is not in any of the datarams, a cache miss signal is generated by predictor 302 and policy counter 304 is updated to reflect that a cache miss occurred. In one embodiment, a scratch pad, fill buffer, or other memory is checked in parallel with the remaining datarams.

When predictor 302 is operating in the second power-saving mode, predictor 302 enables all tagrams associated with the datarams of the cache in a first processing cycle. This mode of operation increases the power consumed by the processor, but it allows the processor to process cache misses more quickly than the first power-saving mode. If it is determined (e.g., using tag compare circuits 308) that the instruction to be fetched is present in one of the datarams, the tagrams are disabled and the dataram containing the instruction is enabled in a second processing cycle. The instruction is then fetched, and predictor 302 and policy counter 304 are updated. If it is determined that the instruction is not in any of the datarams, a cache miss signal is generated by predictor 302, and policy counter 304 is updated to reflect that a cache miss occurred. In one embodiment, a scratch pad, fill buffer, or other memory element is checked in parallel with the datarams.

In one embodiment of the present invention, policy counter 304 includes a register (not shown) configured to store a count value. The count value is incremented and decremented, based on cache hits and cache misses, between a first value and a second value (e.g., zero and three). As illustrated in FIG. 3, hit and miss data is provided to policy counter 304 by predictor 302. In operation, the count value initially is set to the first value (e.g., zero) and policy counter 304 provides a first policy signal to predictor 302 that causes predictor 302 to operate in the first power-saving mode. For each cache miss, the count value is incremented. For each cache hit, the count value is decremented. After a selected number of cache misses (e.g., the count value is incremented to a value of three), policy counter 304 provides a second policy signal to predictor 302 that causes predictor 302 to operate in the second power-saving mode. If the count value subsequently is decremented to the first value (e.g., zero), policy counter 304 again provides the first policy signal to predictor 302, and predictor 302 operates in the first power-saving mode.

Figure 4A:
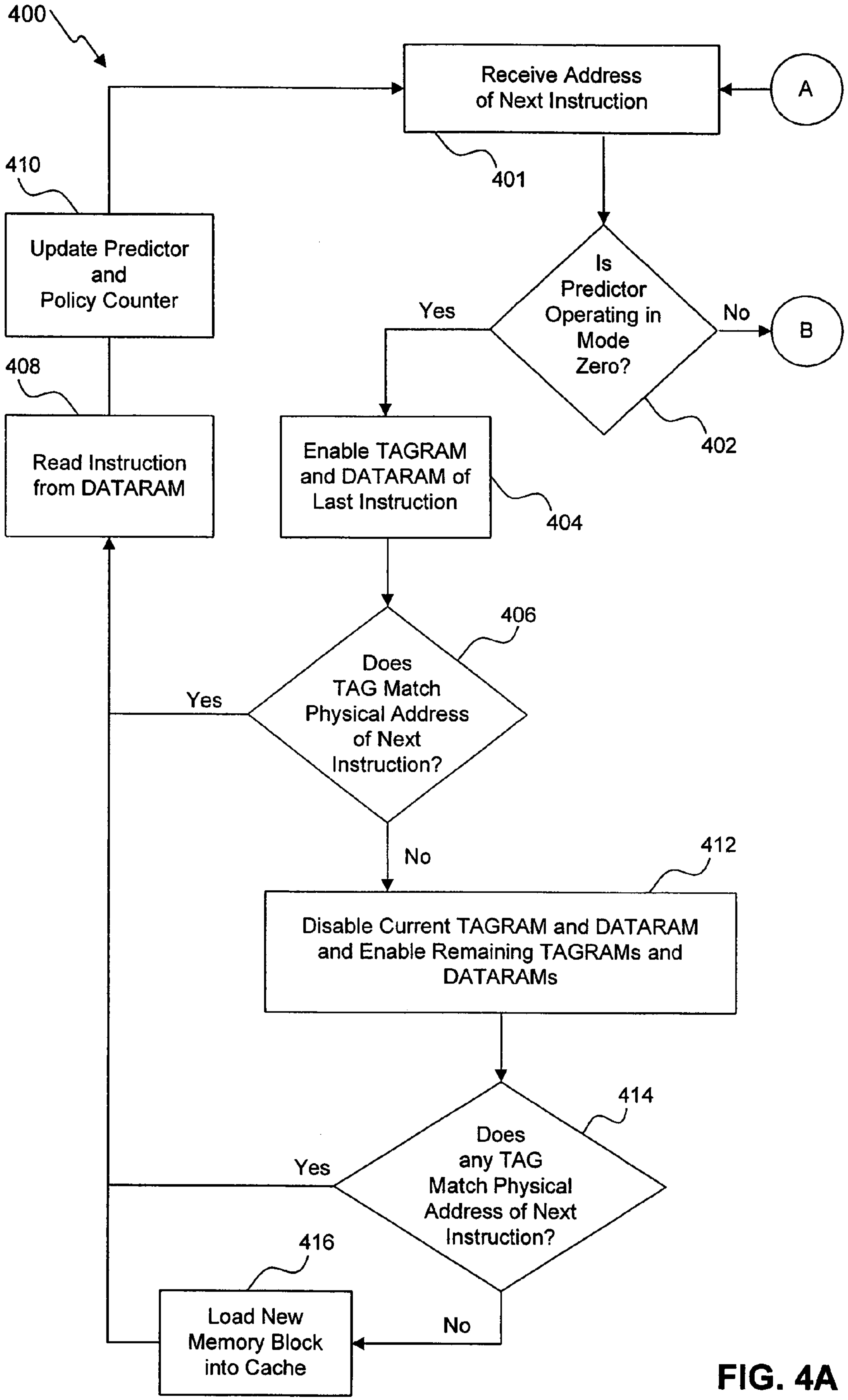
FIGS. 4A and 4B depict a flow chart illustrating the steps of a first method of the present invention.
Figure 4B:
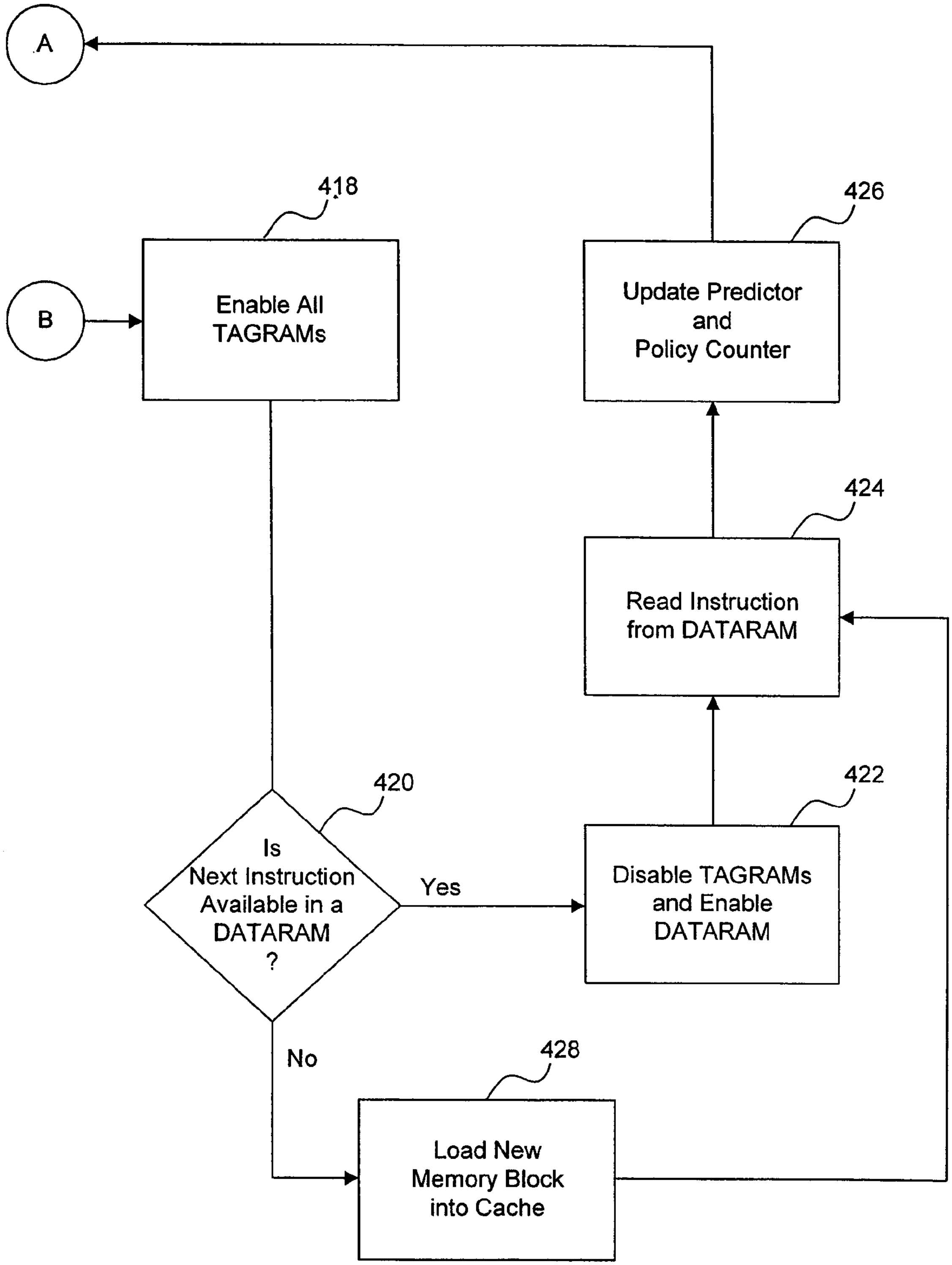

FIGS. 4A and 4B depict a flow chart illustrating the steps of a method 400. Method 400 is used to retrieve instructions from a cache according to an embodiment of the present invention. While method 400 can be implemented, for example, using a processor core according to the present invention such as processor core 100, it is not limited to being implemented by processor core 100. Method 400 starts with step 401.

In step 401, an address for an instruction to be fetched from a multi-way set associative cache is received. The address can be received, for example, by having it loaded into a program counter of a processor.

In step 402, a determination is made whether a predictor of the processor is operating in a particular mode noted in step 402 as mode zero. If the predictor is operating in mode zero (e.g., the first power-saving mode described above), control passes to step 404. If the predictor is not operating in mode zero, control passes to step 418.

In step 404, a dataram predicted by the predictor as containing the instruction to be fetched is enabled. A tagram associated with the dataram also is enabled. In one embodiment of the present invention, the predictor predicts that the dataram that contained the last instruction fetched also will contain the next instruction to be fetched.

In step 406, a tag portion of the address of the instruction to be fetched is compared to a selected tag in the enabled tagram. The selected tag is the tag pointed to by an index portion of the address received in step 401. If the tag portion of the address matches the selected tag stored in the enabled tagram, and assuming that the selected tag in the tagram is valid, control passes from step 406 to step 408. If the tag portion of the address does not match the selected tag stored in the enabled tagram, control passes from step 406 to step 412.

In step 408, the instruction to be fetched is read from dataram. Control passes from step 408 to step 410.

In step 410, the predictor of the processor and a policy counter of the processor are updated regarding whether a cache hit or a cache miss occurred and whether the prediction made by the predictor regarding which dataram included the instruction was correct. The policy counter provides a policy signal to the predictor that determines whether the predictor operates in mode zero or another mode (e.g., the second power-saving mode described above) based on cache hit and cache miss information. Control passes from step 410 back to step 401.

In step 412, the tagram and dataram enabled in step 406 are disabled, and the remaining tagrams and datarams of the cache are enabled. As described herein, a component of a processor such as a tagram and a dataram can be disabled to reduce power consumption in accordance with the present invention by controlling the input clock signal of the component. Control passes from step 412 to step 414.

In step 414, a determination is made regarding whether the instruction to be fetched is stored within one of the enabled datarams. If the instruction is stored in one of the datarams, control passes to step 408, where the instruction is read from the dataram. If the instruction is not in one of the enabled datarams, a cache miss has occurred, and control is passed to step 416.

In step 416, a new memory block of data is loaded into the cache that includes the instruction to be fetched. In one embodiment, the block of data is loaded into the cache in accordance with method 500 described below. Control passes from step 416 to step 408.

In step 418, all tagrams of the cache are enabled. This allows the processor to determine, for example in a single processing cycle, whether the instruction to be fetched resides in one of the datarams of the cache. Control passes from step 418 to step 420.

In step 420, a determination is made whether the instruction to be fetched resides in one of the datarams. If the instruction is stored in one of the datarams, control passes to step 422. If the instruction is not stored in one of the datarams, control passes to step 428.

In step 422, the tagrams are disabled and the dataram containing the instruction is enabled to allow the instruction to be fetched. Control passes from step 422 to step 424.

In step 424, the instruction to be fetched is read from dataram. Control passes from step 424 to step 426.

In step 426, the predictor of the processor and the policy counter of the processor are updated regarding whether a cache hit or a cache miss occurred. From step 426, control returns to step 401.

In step 428, a new memory block of data is loaded into the cache that includes the instruction to be fetched. In one embodiment, the block of data is loaded into the cache in accordance with method 500 described below. Control passes from step 428 to step 424 so that the instruction can be fetched.

As will be understood by persons skilled in the relevant arts, the steps of method 400 can be varied to change, for example, the number of tagrams and datarams that are enabled and/or disabled in particular steps to accommodate different control schemes. The order of some steps can also be changed. These variations remain within the scope of the present invention. Additionally, memories other than tagrams and datarams of a cache, such as a scratch pad, a fill buffer, etc., can be enabled and/or disabled, as illustrated by FIG. 3.

Figure 5:
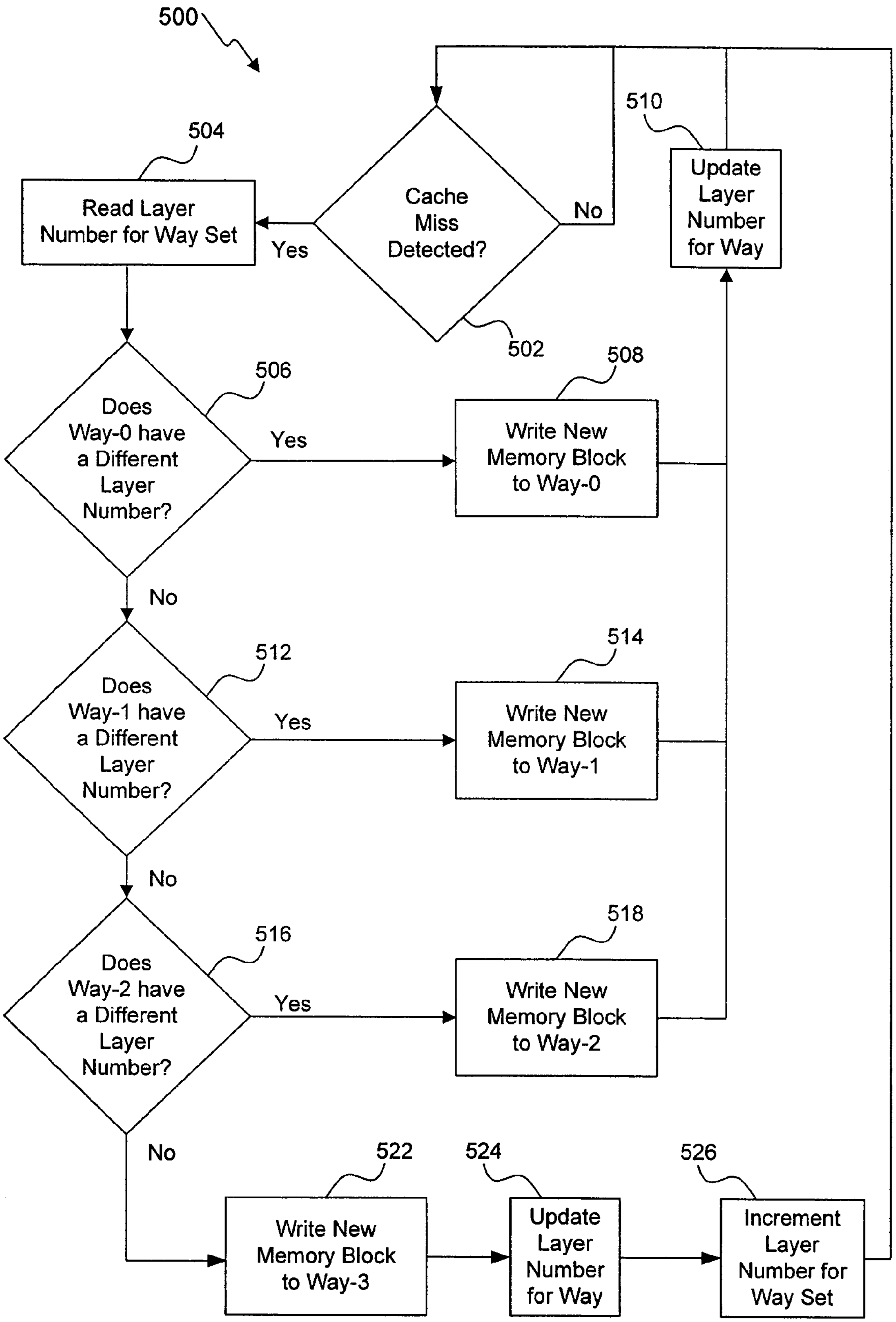
FIG. 5 is a flow chart illustrating the steps of a second method of the present invention.

FIG. 5 is a flow chart illustrating the steps of a method 500 of the present invention. At a high level, method 500 can be thought of as a least recently filled cache refill scheme. More particularly, method 500 is used to load a memory block of data into a 4-way set associative cache following a cache miss. However, as will become apparent to persons skilled in the relevant arts given the description herein, method 500 can be adapted for use with other multi-way set associative caches such as, for example, 2-way set associative caches, 8-way set associative caches, et cetera. As with method 400, method 500 can be implemented, for example, using a processor core according to the present invention such as processor core 100, but it is not limited to being implemented by processor core 100.

Method 500 starts at step 502. In step 502, the method waits for a cache miss to occur. When a cache miss is detected, control transfers to step 504.

In step 504, a layer number for a way set associated with the cache miss is read. As used herein, the term way set means the fields of datarams of a multi-way set associative cache in which a particular block of memory can be stored. The way set layer number is a value used to control the refilling of the cache with new blocks of data.

In step 506, the way set layer number read in step 504 is compared to a layer number for way-0 of the cache. If the layer number for way-0 is different than the way set layer number, control passes to step 508. If the layer number is not different than the way set layer number, control passes to step 512.

In step 508, a new memory block of data is written to way-0 of the cache. Control then passes to step 510.

In step 510, the layer number for the way in which the memory block of data was written is incremented. Control passes from step 510 back to step 502.

In step 512, the way set layer number read in step 504 is compared to a layer number for way-1 of the cache. If the layer number for way-1 is different than the way set layer number, control passes to step 514. If the layer number is not different than the way set layer number, control passes to step 516.

In step 514, a new memory block of data is written to way-1 of the cache. Control then passes to step 510.

In step 516, the way set layer number read in step 504 is compared to a layer number for way-2 of the cache. If the layer number for way-2 is different than the way set layer number, control passes to step 518. If the layer number is not different than the way set layer number, control passes to step 522.

In step 518, a new memory block of data is written to way-2 of the cache. Control then passes to step 510.

In step 522, a new memory block of data is written to way-3 of the cache. Control then passes to step 524.

In step 524, the layer number for way-3 is incremented. Control then passes from step 524 to 526.

In step 526, the layer number for the way set is incremented. Control passes from step 526 back to step 502.

In one embodiment of the present invention, method 500 is modified as follows. First, the way set layer number is modified to be a fixed value (e.g., one) rather than a variable value. This allows step 504 to be bypassed or eliminated. At start up of the processor, all of the layer numbers of the cache are set to a value different than the fixed value (e.g., zero). Next, step 510 is modified to change the layer number for a way to the fixed value (e.g., one) after a block of data has been written to the way. Finally, steps 524 and 526 are replaced with a new step that resets the appropriate layer numbers of the ways to a value other than the fixed value (e.g., zero) so that the next cache refill is written to way-0 (because the layer number for way-0 will now be different than the fixed way set layer number when step 506 is performed).

As will be understood by persons skilled in the relevant arts given the description herein, method 500 and its modifications eliminate much of the overhead associated with conventional least recently used cache refill schemes because there is no need to keep track of how often a block of data in the cache is used. Additionally, the refill scheme of method 500 improves the accuracy of the predictor of the present invention (e.g., when the predictor is set to predict that the next instruction will come from the same way as the last instruction). This is due to the fact that the cache refill scheme of the present invention improves the order between cache line entries and provides convergence of unordered entry segments.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. A processor core having a multi-cycle processing pipeline, comprising:

a multi-way set associative cache, each way of the cache having an associated tagram;

a predictor coupled to the multi-way set associative cache; and a policy counter coupled to the predictor and configured to provide a policy signal indicative of a power-saving mode to the predictor, wherein the predictor operates in one of a first power-saving mode and a second power-saving mode in response to the policy signal, and when operating in the first power-saving mode, the predictor enables during a first processing cycle a first tagram associated with a first way predicted by the predictor as containing an instruction to be fetched from the multi-way set associative cache, and when operating in the second power-saving mode, the predictor enables during the first processing cycle all tagrams associated with the multi-way set associative cache.

2. The processor core of claim 1, wherein the predictor, when operating in the first power-saving mode, enables a first dataram of the multi-way set associative cache during the first processing cycle.

3. The processor core of claim 2, wherein following a misprediction by the predictor, when operating in the first power-saving mode, the predictor disables the first tagram and the first dataram and enables during a second processing cycle a second tagram associated with a second way of the multi-way set associative cache.

4. The processor core of claim 1, wherein the policy counter comprises a register configured to store a value that is incremented and decremented, based on cache hits and cache misses, between a first value and a second value.

5. The processor core of claim 1, further comprising:

a cache refill circuit, coupled to the multi-way set associative cache, that (1) selects a way of the multi-way set associative cache, (2) compares a layer number associated with a selected field of the way to a way set layer number, (3) if the layer number is not equal to the way set layer number, writes a block of data from a memory to the selected field, (4) if the layer number is equal to the way set layer number, repeats steps (1), (2), and (3) for additional ways of the multi-way set associative cache until the block of memory is written to the multi-way set associative cache, and (5) increments the layer number of the selected field in which the block of memory is written.

6. A cache way predictor, comprising:

a predictor circuit; and a policy counter circuit coupled to the predictor circuit and configured to provide a policy signal indicative of a power-saving mode to the predictor circuit, wherein the predictor circuit operates in one of a first power-saving mode and a second power-saving mode in response to a policy signal provided by the policy counter circuit to the predictor circuit, and when operating in the first power-saving mode, the predictor circuit enables during a first processing cycle a first tagram associated with a first way of a multi-way set associative cache predicted by the predictor circuit as containing an instruction to be fetched from the multi-way set associative cache, and when operating in the second power-saving mode, the predictor circuit enables during the first processing cycle all tagrams associated with the multi-way set associative cache.

7. The cache way predictor of claim 6, wherein the predictor circuit, when operating in the first power-saving mode, enables a first dataram of the multi-way set associative cache during the first processing cycle.

8. The cache way predictor of claim 7, wherein following a misprediction by the predictor circuit, when operating in the first power-saving mode, the predictor circuit disables the first tagram and the first dataram and enables during a second processing cycle a second tagram associated with a second way of the multi-way set associative cache.

9. The cache way predictor of claim 6, wherein the policy counter circuit comprises a register configured to store a value that is incremented and decremented, based on cache hits and cache misses, between a first value and a second value.

10. A computer readable storage medium comprising a processor core embodied in software, the processor core comprising:

a multi-way set associative cache, each way of the cache having an associated tagram;

a predictor coupled to the multi-way set associative cache; and a policy counter coupled to the predictor and configured to provide a policy signal indicative of a power-saving mode to the predictor, wherein the predictor operates in one of a first power-saving mode and a second power-saving mode in response to a policy signal provided by the policy counter to the predictor, and when operating in the first power-saving mode, the predictor enables during a first processing cycle a first tagram associated with a first way predicted by the predictor as containing an instruction to be fetched from the multi-way set associative cache, and when operating in the second power-saving mode, the predictor enables during the first processing cycle all tagrams associated with the multi-way set associative cache.

11. The computer readable storage medium of claim 10, wherein the predictor, when operating in the first power-saving mode, enables a first dataram of the multi-way set associative cache during the first processing cycle.

12. The computer readable storage medium of claim 11, wherein following a misprediction by the predictor, when operating in the first power-saving mode, the predictor disables the first tagram and the first dataram and enables during a second processing cycle a second tagram associated with a second way of the multi-way set associative cache.

13. The computer readable storage medium of claim 10, wherein the policy counter comprises a register configured to store a value that is incremented and decremented, based on cache hits and cache misses, between a first value and a second value.

14. The computer readable storage medium of claim 10, wherein the processor core further comprises:

a cache refill circuit, coupled to the multi-way set associative cache, that (1) selects a way of the multi-way set associative cache, (2) compares a layer number associated with a selected field of the way to a way set layer number, (3) if the layer number is not equal to the way set layer number, writes a block of data from a memory to the selected field, (4) if the layer number is equal to the way set layer number, repeats steps (1), (2), and (3) for additional ways of the multi-way set associative cache until the block of memory is written to the multi-way set associative cache, and (5) increments the layer number of the selected field in which the block of memory is written.

15. The computer readable storage medium of claim 10, wherein the computer-readable program code is hardware description language code.

16. The computer readable storage medium of claim 15, wherein the computer-readable program code is one of Verilog hardware description language code, VHDL hardware description language code, and SystemC hardware description language code.

17. A method for writing data to a multi-way set associative cache of a processor following a cache miss, wherein the cache includes a plurality of datarams, each dataram includes a plurality of fields for storing data, and each field has an associated layer number, the method comprising:

(1) detecting a cache miss;

(2) retrieving a block of data from a memory;

(3) selecting a first way of the cache;

(4) comparing a layer number associated with a selected field of the first way of the cache to a way set layer number;

(5) if the layer number is not equal to the way set layer number, writing the block of data to the selected field;

(6) if the layer number is equal to the way set layer number, repeating steps (3), (4), and (5) for additional ways of the cache until the block of memory is written to the cache; and (7) incrementing the layer number of the selected field in which the block of memory is written.

18. The method of claim 17, further comprising:

(8) incrementing the way set layer number if the layer numbers for each field associated with a particular way set layer number are equal.

19. The method of claim 17, wherein the multi-way set associative cache is one of a 2-way set associative cache, a 4-way set associative cache, and an 8-way set associative cache.

20. The method of claim 17, wherein the layer numbers associated with the fields of the datarams are stored in a data structure separate from the datarams.

* * * * *

UNITED STATES PATENT AND TRADEMARK OFFICE

CERTIFICATE OF CORRECTION

PATENT NO. : 7,562,191 B2 
APPLICATION NO. : 11/272719
DATED : July 14, 2009
INVENTOR(S) : Matthias Knoth It is certified that error appears in the above-identified patent and that said Letters Patent is hereby corrected as shown below:

Column 10, line 53:
"A processor core having multi-cycle processing pipe-" should read --A hardware processor core having multi-cycle processing pipe- --.

Column 11, line 7:
"The processor core of claim 1, wherein the predictor," should read --The hardware processor core of claim 1, wherein the predictor,--.

Column 11, line 11:
"The processor core of claim 2, wherein following a" should read --The hardware processor core of claim 2, wherein following a--.

Column 11, line 17:
"The processor core of claim 1, wherein the policy" should read --The hardware processor core of claim 1, wherein the policy--.

Column 11, line 21:
"The processor core of claim 1, further comprising:" should read --The hardware processor core of claim 1, further comprising:--.

Column 12, lines 3-12:
"A computer readable storage medium comprising a processor core embodied in software, the processor core comprising:
a multi-way set associative cache, each way of the cache having an associated tagram;
a predictor coupled to the multi-way set associative cache; and
a policy counter coupled to the predictor and configured to provide a policy signal indicative of a power saving mode to the predictor,"
should read
--A computer readable storage medium having encoded thereon computer readable program code, the computer readable program code, comprising:
computer readable program code to generate a multi-way set associative cache, each way of the cache having an associated tagram;
computer readable program code to generate a predictor coupled to the multi-way set associative cache; and
computer readable program code to generate a policy counter coupled to the predictor and configured to provide a policy signal indicative of a power saving mode to the predictor,--.

UNITED STATES PATENT AND TRADEMARK OFFICE

CERTIFICATE OF CORRECTION

PATENT NO. : 7,562,191 B2
APPLICATION NO. : 11/272719
DATED : July 14, 2009
INVENTOR(S) : Matthias Knoth It is certified that error appears in the above-identified patent and that said Letters Patent is hereby corrected as shown below:

Column 12, line 42:
"wherein the processor core further comprises:" should read --further comprising:--.

Column 12, lines 43-44:
"a cache refill circuit, coupled to the multi-way set associative cache, that" should read --computer readable program code to generate a cache refill circuit, coupled to the multi-way set associate cache, that:--.

Column 12, line 59:
"wherein the computer-readable program code is hardware" should read --wherein the computer readable program code is hardware--.

Column 12, line 62:
"wherein the computer-readable program code is one of Ver-" should read --wherein the computer readable program code is one of Ver- --.

Signed and Sealed this

First Day of September, 2009

David J. Kappos

David J. Kappos
*Director of the United States Patent and Trademark Office*